Figure 1:
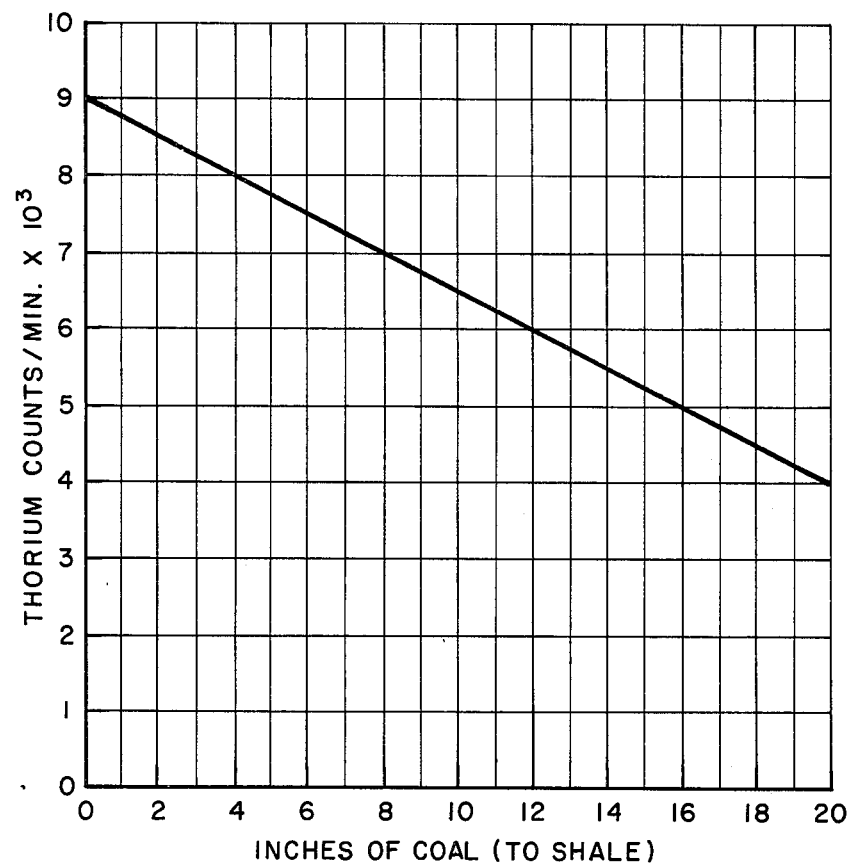

United States Patent [19]

Fertl et al.

[11] 4,115,688
[45] Sep. 19, 1978

[54] MINING AND DRILLING CONTROL OF DISTANCE TO THE COAL-SHALE INTERFACE - THORIUM MEASUREMENT BY GAMMA SPECTROMETRY

[75] Inventors: Walter H. Fertl, Houston, Tex.; Preston L. Gant, Ponca City, Okla.

[73] Assignee: Continental Oil Company, Ponca City, Okla.

[21] Appl. No.: 783,091

[22] Filed: Mar. 31, 1977

[51] Int. Cl.² .................. G01V 5/00; E21B 47/00
[52] U.S. Cl. ............................. 250/253; 175/41
[58] Field of Search ............ 250/253, 254, 255, 262; 175/41

[56] References Cited

U.S. PATENT DOCUMENTS 3,940,610  2/1976  Dennis et al. .................. 250/253

Primary Examiner—Alfred E. Smith
Assistant Examiner—Janice A. Howell
Attorney, Agent, or Firm—Cortlan R. Schupbach, Jr.

[57] ABSTRACT

A method for determining the distance from a given point in a coal seam to shale by sensing the thorium radiation from shale layers positioned about the coal seam. The invention is useful for maintaining a drill in a desired position in a coal seam and guiding the drill in response to the sensed radiation.

10 Claims, 1 Drawing Figure

MINING AND DRILLING CONTROL OF DISTANCE TO THE COAL-SHALE INTERFACE - THORIUM MEASUREMENT BY GAMMA SPECTROMETRY

This invention relates to a method for sensing coal/shale in coal seam. More specifically, this invention relates to a method for sensing shale interfaces in coal seams by means of detecting gamma radiation emitted from thorium contained in the said shale.

In the mining of coal, the coal/shale interface has long been a source of problems in that automatic mining tools have been broken when unexpectedly encountering the coal/shale interface. The transition from mining relatively soft coal to the relatively hard shale provides high impact shocks to the mining equipment, often blunting or breaking the cutting tips.

Another problem is that mines often have very high humidity levels. Shale surrounding these coal seams tends to draw the moisture into the shale, reducing its structural integrity. This shale, if overhead, becomes a roof fall hazard, and if underfoot, becomes slick and "mushy" and impedes mining operations. Many mines have found it necessary in practice to leave coal between the mine atmosphere and shale layers to prevent water absorption into shale.

It has thus long been realized that a method is needed for determining the distance between the mining machine and the coal/shale interface in order to avoid such problems. For example, in long hole drilling or continuous mining, a method for sensing shale is needed in order that the drill may remain as nearly at the center of the coal seam as possible, or remain a fixed distance away from the shale in the case of thicker coal seams. In the case of remaining a fixed distance from the shale, normally a layer of coal from 6 to 12 inches in thickness is left at both the top and bottom interface.

Many methods have been developed for determining the distance to the coal shale interface. Among these are those described in U.S. Pat. No. 3,823,787 wherein a bore hole is drilled into the mineral vein for guiding the cutting machine, the distance to the shale from the bore hole being determined by the insertion of a detector package having an internal radiation source. However, this method has several disadvantages. These coal/shale interface detectors have typically used a gamma density gauge using a Cesium 137 or a Cobalt 60 source. This gauge has two primary disadvantages. First such gauges do not "look" very far into the coal, about 12 inches being the maximum utility since the gamma ray has to travel twice the thickness of the coal. Secondly, it is necessary to obtain a radiation-safe source package requiring considerable shielding which is heavy, bulky, and undesirably expensive.

U.S. Pat. No. 3,019,338 relates to a method of providing mining machines with means for irradating the formations together with a detector for measuring radiation scattered by the formations. This total radiation of the shale has the advantage of the radiation having to travel only one way provided there is only radiation detected from the shale and not from the coal. However, since uranium is very mobile in an acid medium, said uranium sometimes penetrates significantly into the coal seam where it is reduced and fixed, thus giving misleading values for the distance to the shale coal interface.

Other methods of guiding drilling apparatus have been described in U.S. Pat. Nos. 3,853,185, and 3,907,045. Both these methods, however, require first the drilling of a pilot hole and in the case of 3,853,185 two pilot holes, insertion of a signaling package, and detection of the signals in order to adequately guide the mining machines. Clearly this methods are time-consuming and relatively expensive.

It would therefore be of great benefit to the art to provide a method whereby shale can be sensed through from 5–24 inches of coal and thus allow the guidance of a drilling or a cutting machine.

It is therefore an object of the present invention to provide a simple and efficient method for detecting shale coal interface from a given point in a coal seam. Other objects will become apparent to those skilled in this art as the description proceeds.

It has now been discovered that the distance to a coal/shale interface from a point in a coal seam can be determined by measuring the amount of gamma radiation emitted by thorium contained in the shale layer based upon the strength of the signal received.

The instant invention is based on the fact that the thorium content of coal is almost non-detectible whereas the thorium content of shale is relatively appreciable. In addition, the gamma radiation emmited by thorium decay, the most penetrating of the natural radiations, is uniformly spread throughout the coal deposit, is naturally occuring and thus does not require a radiation source, and for the purposes described herein requires only intermittant calibration. The detection package is in a matrix containing almost no thorium and is in the enviable position of sensing radiation from a source outside the coal seam. It will thus be apparent that the instant invention will provide an accurate determination of distance to the coal seam.

The instant invention relates in general to detection of shale from a source located in a coal seam. It will be readily apparent that the detection is primarily of mass shale formations and not the smaller portions of shale usually found embedded in coal.

The natural radiation emmitted by the decay of thorium can be separated from radioactive emissions of other elements such as uranium and potassium such that each can be determined individually. Such methods are illustrated in U.S. Pat. Nos. 2,897,368 and 3,105,149. These references relate to geophysical prospecting devices adaptable to use from aircraft.

In the process of the instant invention a gamma ray spectrometer using an energy proportional detector is used in the sensing probe. The energy proportional detector is preferably at least a 2-inch diameter by 2-inch thick sodium iodide or cesium iodide detector. Thorium has a 2.6 MEV gamma emission which is very penetrating and is completely separable from potassium radiation and is essentially unaffected by uranium radiation. Uranium radiation contributes about 4% of the signal received and can be removed by spectro analysis if more qualitative results are necessary. However, the instant invention is primarily directed toward detecting mass shale deposits and such separation would normally not be made.

Total thorium radiation is reasonably low, thus longer counts can be used to increase the statistical accuracy of the system if necessary. For example, by increasing crystal size counting time can be reduced to the period desired.

In the application of controlling a mining machine, several mechanisms can be used to control the drill or cutters to obtain a constant thorium count rate level thus leaving a constant thickness of coal between the mining machine cut and the shale coal interface to help protect the mine from roof falls or floor deterioration. Thus only the coal is cut and in addition the mining machine is protected from encountering the harder shale.

For many purposes in high production mining, a simple high level discriminator with a cutoff for any energy below 2.4 MEV should be adequate. The mounting of such instrument packages is the same as that for natural radioactivity measurement. Analysis of the incoming detection can be done using any instruments well-known to those skilled in the art. These systems are well-known and are commercially available. Among such acceptable systems are the TN 1705 analyzer manufactured and sold by Tracor Northern Corporation. However, it will be readily apparent that any instrument which performs a similar function can be used.

The level of thorium varies from coal deposit to coal deposit but one coal deposit will have a thorium content insurrounding shale within a reasonable level of another. The thorium content in any one general area of shale surrounding any coal deposit will remain essentially constant. The readings on the instrument can be calibrated to keep the mining machine at the desired distance from the shale face by the simple expedient of measuring the radioactivity at known distances from the coal shale interface. For example, clearing the coal directly adjacent to the interface and taking a reading would allow a base line for that particular coal deposit. Readings taken at varying distances from the shale with coal disposed between the shale and the detector will allow a distance chart to be developed for the particular coal deposit quickly and easily. Such a chart is shown in FIG. 1. For example, by simply physically drilling into the coal the depth of the coal over the shale can be easily determined. A reading is then taken away from the drill hole and recorded as a point which will develop the graph as shown in FIG. 1. With such a graph the detecting package can be easily adapted to operate in any given range thus keeping the mining machine at a certain distance from the coal shale interface.

Since coal seams generally undulate gently as they are traversed horizontally, and since coal seams often travel great distances, the thorium content surrounding any deposit can vary slightly as coal is mined from the position at which the original calibration was made. Thus it will be necessary at intervals to recalibrate the instrument using the techniques set forth. The period of time between such calibrations will vary according to several factors such as the speed of the mining and the distance from the original measurement.

The invention is more concretely described with reference to the example below. The example is intended for illustrative purposes and should not be construed to limit the present invention.

FIG. 1 illustrates the relationship of thorium counts vs coal thickness to the shale overlying and underlying coal seams. These data were derived in part from actual mine samples and in part from lab data and literature. FIG. 1 describes the relationship of thorium emission to thickness of coal between the detecting apparatus and surrounding shale. More specifically, the figure indicates the thickness of coal between a detector and surrounding shale. The data is determined by drilling detector holes to various depths in the coal and describing the results in an useful fashion such as that exemplified. Thereafter, once the desired distance to shale is selected a simple high energy cutoff set to the desired level will indicate when the shale is approached too closely. The example is a close approximation based upon a 5 × 5 crystal or one of an equivalent volume, the crystal comprising cesium iodide or sodium iodide. It should be emphasized that the larger crystal gives much more accurate readings. For example, a 2 × 4 crystal would give approximately ⅛ the counting rate shown for the 5 × 5 crystal, but this deficiency can be rectified by simply taking longer reading times.

EXAMPLE 1

When the process of the present invention is used in long hole drilling, the instrument should be calibrated in a mine by drilling a series of holes in a coal seam face (approximately 3 feet thick) to various depths (or distances) from the shale bed. The probe would be placed in each of 3 or 4 holes, at about 0–1, 4, 8 and 12 inch distances from the coal shale interface. Readings would be taken for long enough times to get the statistical variation to the desired level. Since the count rate will drop with distance, the measuring time for holes further away from the shale would necessarily increase to get the same total counts. $1\sigma = \sqrt{N}$ (N = number of counts) for example $\sqrt{1000} = \pm 31$ counts which means that 67% of the readings would fall within the range. A second order (2Y) derivation or ± 62 counts would cover 95% of the measurements, where $\sigma$ is standard deviation, and 1Y is $\pm \sqrt{N}$ and 67% of readings fall within this range, and 2Y is $\pm 2\sqrt{N}$ and 95% of readings fall within this range.

EXAMPLE 2

Calibration of the above invention for long wall mining can be done by placing the detector on the miner with appropriate shielding in the backward direction if necessary, and taking a series of thorium gamma readings at various coal thicknesses between the detector and the shale. The calibration is then made and a graph drawn as shown in FIG. 1. For example, FIG. 1 shows that at a thorium count of 4,000 per minute, approximately 19½ inches of coal will overlie the level at which the mining machine is cutting.

It will thus be readily apparent that the instant invention has provided a simplified and more efficient method for determining the distance to the coal shale interface from a point in a coal seam than any heretofore described. The invention likewise avoids many disadvantages of the prior art and allows a continuous mining machine to be operated while maintaining a fixed distance from the coal shale interface.

While certain embodiments and details have been shown for the purpose of illustrating this invention, it will be apparent to those skilled in this art that various changes and modifications may be made herein without departing from the spirit or the scope of the invention.

We claim:

1. A method for sensing distance to shale from coal deposits comprising (1) determining the amount of gamma emission from thorium contained in shale surrounding the coal deposit; (2) measuring the amount of said gamma emission from thorium at points in the coal deposit, the distance from said points to the shale being predetermined; (3) correlating the ratio of gamma emission from (1) and (2) to provide a gamma emission to coal thickness relationship for the coal deposit; and (4) closely approximating distance from subsequent measuring points in the coal deposit to surrounding shale using the relationship determined in (3).

2. A method as described in claim 1 wherein the gamma radiation is measured by spectrometric methods.

3. A method as described in claim 2 wherein the detector is a sodium iodide or cesium iodide crystal.

4. A method as described in claim 1 wherein said sensing is carried out in a bore hole.

5. A method as described in claim 1 wherein said distance to said shale is determined continuously.

6. A method as described in claim 5 wherein said determination is made during the mining of coal.

7. A method as described in claim 6 wherein said determination is used to control mining machines at a specified distance from the coal shale interface.

8. An apparatus for controlling a mining machine in a coal seam while maintaining a preset distance from the coal shale interface comprising:
   a. a detection apparatus to determine the gamma emission of thorium contained in said shale,
   b. means for detecting said gamma emission,
   c. means for controlling said mining machine in response to said gamma emission to maintain a predetermined distance from the shale, and
   d. means for allowing said machine to operate continuously.

9. An apparatus as described in claim 8 wherein the detecting material is cesium or sodium iodide crystals.

10. An apparatus as described in claim 2 wherein a high level discriminator registering only energies above 2.4 MEV is used.

* * * * *

UNITED STATES PATENT OFFICE
CERTIFICATE OF CORRECTION

PATENT NO. : 4,115,688
DATED : September 19, 1978
INVENTOR(S) : Walter H. Fertl and Preston L. Gant It is certified that error appears in the above-identified patent and that said Letters Patent are hereby corrected as shown below:

Column 2, line 7, "this" should be --these--.

Column 4, line 31, "(2Y)" should be --(2$\sigma$)--.

Column 4, line 33, "1Y" should be --1$\sigma$--.

Column 4, line 34, "2Y" should be --2$\sigma$--.

Signed and Sealed this

Twenty-fourth Day of April 1979

[SEAL]

Attest:

RUTH C. MASON
Attesting Officer

DONALD W. BANNER
Commissioner of Patents and Trademarks